US006811268B2

(12) United States Patent
Watson

(10) Patent No.: US 6,811,268 B2
(45) Date of Patent: Nov. 2, 2004

(54) WATER-RESISTANT, SHADE APPARATUS FOR ATTACHMENT TO AN OPTICAL DEVICE

(76) Inventor: Christopher M. Watson, 1193 N. Franklin St. Ext., Washington, PA (US) 15301

( * ) Notice: Subject to any disclaimer, the term of this patent is extended or adjusted under 35 U.S.C. 154(b) by 29 days.

(21) Appl. No.: 10/191,731

(22) Filed: Jul. 8, 2002

(65) Prior Publication Data

US 2002/0167731 A1 Nov. 14, 2002

Related U.S. Application Data

(63) Continuation-in-part of application No. 09/670,183, filed on Sep. 26, 2000, now Pat. No. 6,416,189.

(51) Int. Cl.[7] .............................................. G02B 21/00
(52) U.S. Cl. ...................... 359/611; 359/600; 359/511; 42/129; 42/143
(58) Field of Search ................................ 359/611, 601, 359/511; 42/129, 143; 354/600

(56) References Cited

U.S. PATENT DOCUMENTS

| | | | | | |
|---|---|---|---|---|---|
| 1,283,963 A | * | 11/1918 | Takahashi | .................... | 359/511 |
| 2,488,188 A | * | 11/1949 | Halvorson | .................... | 42/129 |
| 2,522,897 A | * | 9/1950 | Rotter | ......................... | 220/264 |
| 2,849,795 A | * | 9/1958 | Vissing | ......................... | 42/129 |
| 5,561,563 A | * | 10/1996 | Chesnut et al. | ............. | 359/823 |
| D445,475 S | * | 7/2001 | Spear | ......................... | D22/108 |

* cited by examiner

Primary Examiner—Drew A. Dunn
Assistant Examiner—Joshua L Pritchett
(74) Attorney, Agent, or Firm—Richard K. Thomson

(57) ABSTRACT

A water-resistant scope shade is provided having a sun shielding barrel which includes a barrel grasping collar, a barrel body, and a pivotal hook affixed to the barrel. The sun shielding barrel is removably attached to a sighting end of a telescopic sight of a rifle or other optical device. The pivotal hood includes lenses of a circular configuration to be fittingly received on a collar of the pivoting hood. A second embodiment has both a pivoting hood housing the lens and a pivoted cover for protecting the lens in the installed position.

12 Claims, 8 Drawing Sheets

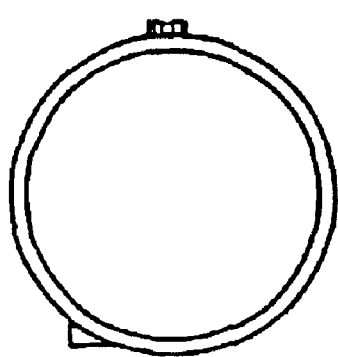
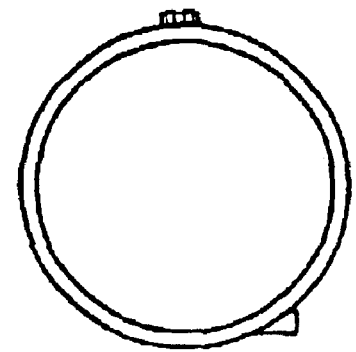
*Figure 5*     *Figure 6*
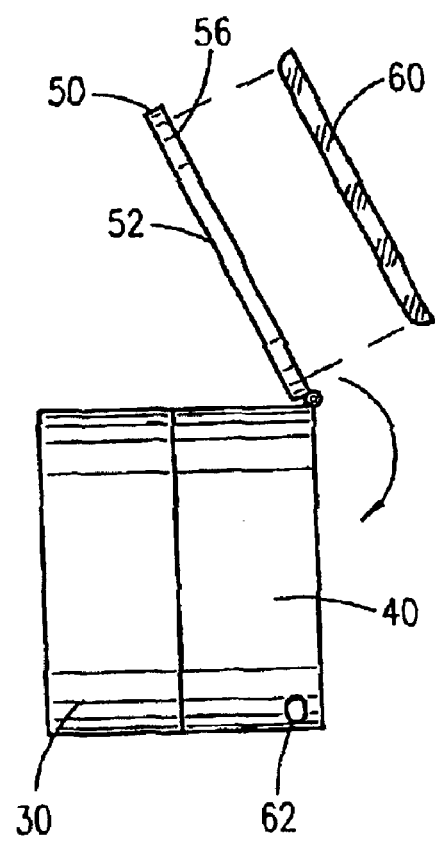
*Figure 7*

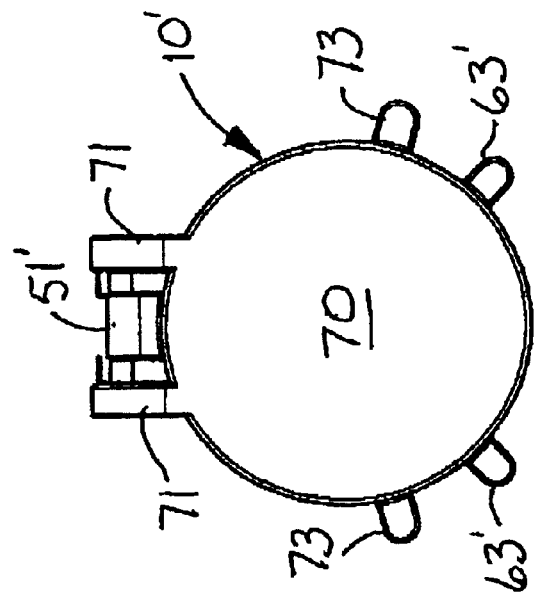
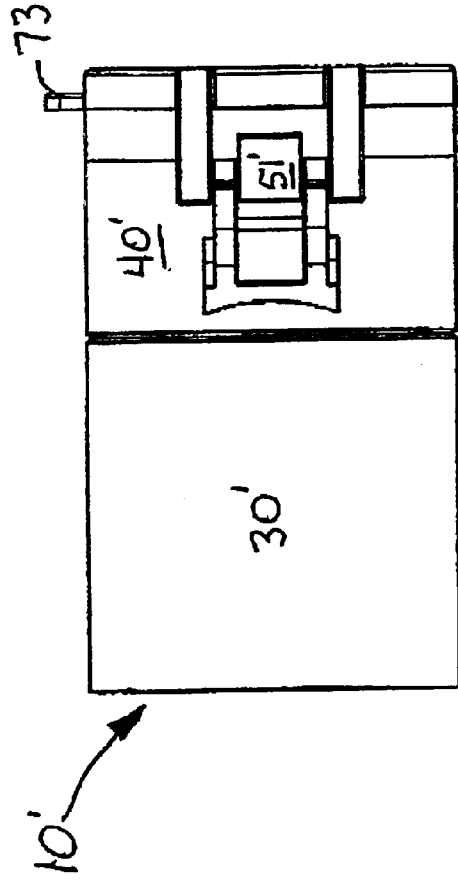
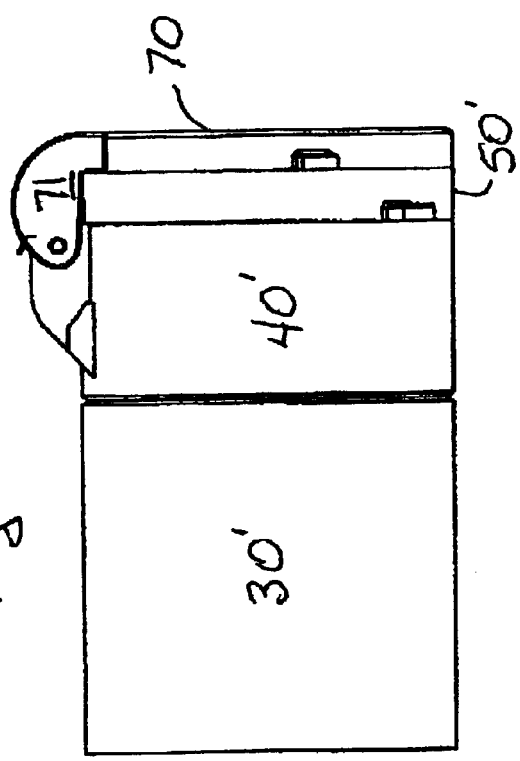

WATER-RESISTANT, SHADE APPARATUS FOR ATTACHMENT TO AN OPTICAL DEVICE

RELATED APPLICATIONS

This application is a continuation-in-part application of U.S. patent application Ser. No. 09/670,183 filed Sep. 26, 2000, now U.S. Pat. No. 6,416,189.

BACKGROUND OF THE INVENTION

1. Field of the Invention

The present invention relates generally to sun shielding attachments for optical devices including gun sights, cameras, telescopes, binoculars, and, more particularly, to a water-resistant, shade attachment apparatus for optical devices.

2. Description of the Related Art

Over the years, modern advances in hunting equipment have enhanced the sport, providing hunters with increased success. Among these products, scopes used on high-powered rifles as well as hunting handguns offer long-range targeting capabilities with exceptional accuracies. However, as with most precision equipment, they must be treated with care. The physical dangers can affect the aesthetics and accuracy of such scopes. Additionally, environmental dangers such as dirt, dust, rain and the like can have an impact on the usage and targeting capabilities of a scope as well. Accordingly, there is a need for a device that will allow for the protection of gun and rifle scopes by protecting them from environmental damage such as rain, dirt and dust.

A search of the prior art did not disclose any patents that read directly on the claims of the instant invention; however, the following references were considered related. The following patents disclose the design and function of a front rifle scope guard: U.S. Pat. No. 4,926,560 issued in the name of Kilgore et al.; U.S. Pat. No. 4,815,822 issued in the name of Bramhall; U.S. Pat. No. 4,089,117 issued in the name of Villareal; U.S. Pat. No. 3,983,634 issued in the name of Erickson; U.S. Pat. No. 2,855,680 issued in the name of Christensen; and U.S. Pat. No. D 279,194 issued in the name of Surber.

U.S. Pat. No. 4,610,517 issued in the name of Fukino et al. Describes a clamp for a lens hood.

U.S. Pat. No. 4,050,791 issued in the name of Watanabe discloses a filter holder insertable into the lens barrel of a camera.

U.S. Pat. No. 3,977,113 issued in the name of Howell describes a guard for the telescopic sight of a rifle.

Consequently, a need has been felt for providing a device which allows for both shading of sunlight when using a rifle scope so as to improve the optics when used in all lighting conditions, as well as to alternately function as a mechanical and rain guard, protecting the scope from water or superficial mechanical damage.

SUMMARY OF THE INVENTION

Therefore, it is an object of the present invention to provide a user with a water-resistant, protective attachment apparatus for optical devices which allows them to enhance performance regardless of lighting conditions.

Briefly described according to one embodiment of the present invention, an attachable, portable, water-resistant sun shielding barrel is disclosed which includes a barrel body which has a barrel grasping collar for being removably attached to a sighting end of a telescopic sight of a rifle, or the like. In the first embodiment, a pivotal hood is attached to the end of the barrel body opposite to the barrel grasping collar. In a second embodiment, a pivoted cover protects the lens in the hood.

The barrel body is of an elongated flexible, hollow configuration and may be formed of rubber or plastic and extends a longitudinal length of from 1 to 4 inches in a direction from an anterior end to the posterior end of the sun shielding barrel. The barrel grasping collar of the body mates with the sighting end of a telescopic sight. The barrel body is securely held in such position through frictional impingement.

The pivoting hood is attached to the barrel body by a hinge which is mounted at a top of the barrel body at the posterior end of the barrel. The hood may be pivoted at its hinge point to lay flat against a collar of the barrel body. The pivoting hood includes a plurality of projections formed at various points along an inner periphery of the pivoting hood for removably securing a lens. The projections are spaced at an equal distance from one another and are formed of plastic material having resilient properties so as to demountably secure a lens to the inner periphery.

The pivoting hood further includes a thin, soft rubber membrane circumferentially joined to a collar thereof so as to form a water-impermeable seal upon a user laying the hood flat against the collar of the barrel body.

The hood and the barrel body can be locked into their closed position via a hood locking assembly. The hood locking assembly includes a hood release button located adjacent to a hole of the barrel body. After being depressed by a user, the button is designed so as to allow the pivoting hood to be opened, thereby allowing the user to replace the present lens with an alternate lens.

Various degrees of shaded lenses having an anti-fog feature are available to the user; alternatively, a photo-gray lens which automatically adjusts to outside light may be utilized. The shaded lenses not only provide ultraviolet alpha and ultraviolet beta protection, but may also have anti-reflective coatings on one or both surfaces and be scratch- and shatter-resistant, as well.

The lens can be replaced while the present invention remains attached to the telescopic sight, thereby allowing the user to quickly change lens. Once a chosen lens has been securely placed at the inner periphery of the hood, the user simply closes the hood thereby forming a water-impermeable seal which also keeps the sighting end of the telescopic sight dry, clean and protected. The water-resistant scope shade attachment apparatus provides the user with a water-resistant, glare-free rifle telescopic sight attachment which eases eye strain when hunting game in bright sunlight.

A second embodiment provides a cover which may pivot over the hood to protect the lens held therein from weather, dust, and contact with brush, trees, rocks, etc., while moving carrying the rifle during transit. Both the hood and cover are spring-biased to the open position but held shut by frictional contact until the user engages one of two ears on each of the pivotal elements to open them. The hood has a greater resistance to pivoting than the cover in order to enable the cover to be opened without disturbing the hood.

An advantage of the present invention is that it protects the precision components of scope assembly.

Another advantage of the present invention is that it attaches to all conventionally available scope types.

Further, the present invention protects scope from dirt, dust, rain and the like.

Various other features, advantages and characteristics of the present invention will become apparent to one of ordinary skill in the art after a reading of the following specification.

BRIEF DESCRIPTION OF THE DRAWINGS

The advantages and features of the present invention will become better understood with reference to the following, more detailed description and claims taken in conjunction with the accompanying drawings, in which like elements are identified with like symbols, and in which:

FIG. 5 is a rear view thereof shown with the pivoting hood in a closed position;

FIG. 6 is a front view thereof shown with the pivoting hood in an open position;

FIG. 7 is a exploded perspective view of the water-resistant scope shade attachment apparatus according to the preferred embodiment of the present invention;

FIG. 9A is a side view of a second embodiment of the scope shade of the present invention;

FIG. 9B is a top view of the second embodiment;

FIG. 9C is a front view of the second embodiment;

DESCRIPTION OF THE PREFERRED EMBODIMENT

1. Detailed Description of the Figures

Figure 1:
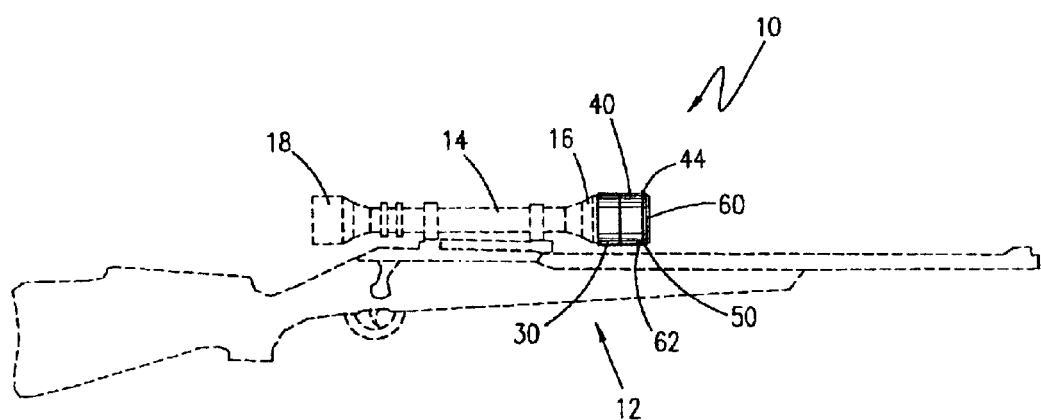
FIG. 1 is a perspective view of a water-resistant scope shade attachment apparatus according to the preferred embodiment of the present invention shown attached to a sighting end of a telescopic sight.
Figure 2:
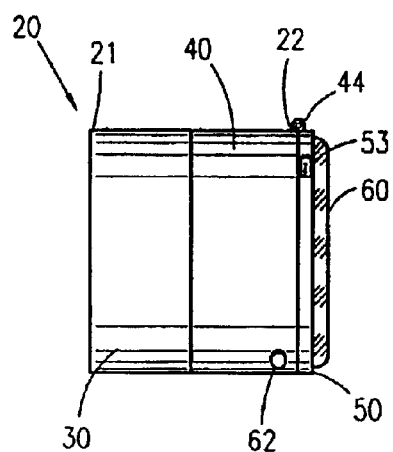
FIG. 2 is a side view of the water-resistant scope shade attachment apparatus according to the preferred embodiment of the present invention.
Figure 3:
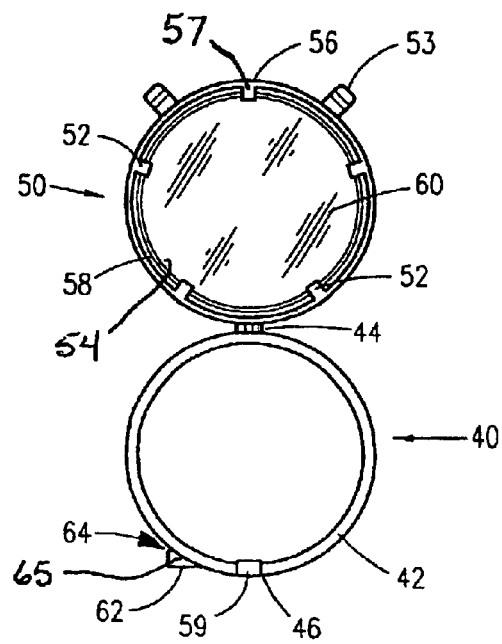
FIG. 3 is a front end elevational view thereof shown with the pivoting hood in an open position.
Figure 4:
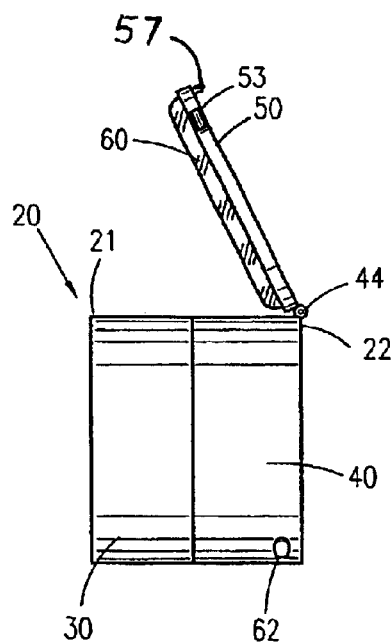
FIG. 4 is a side view thereof shown with the pivoting hood in an open position.
Figure 8:
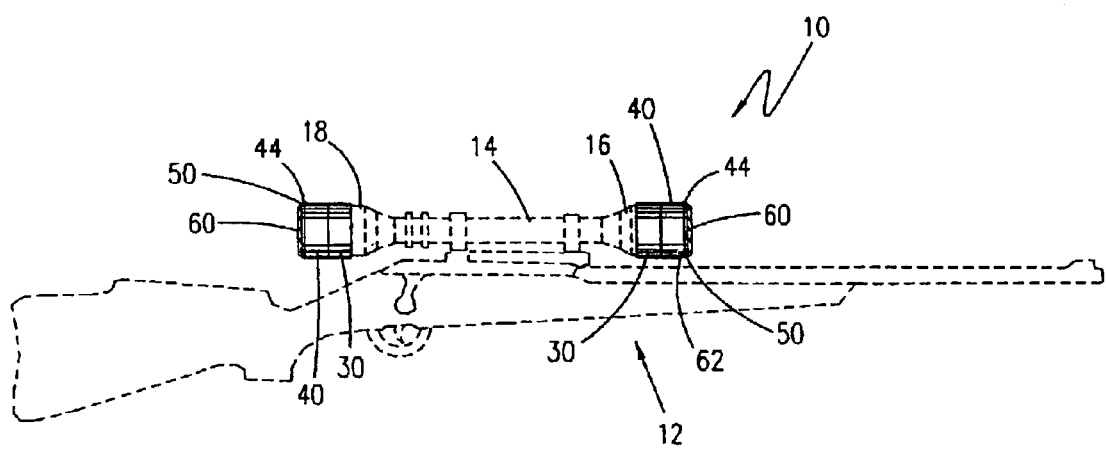
FIG. 8 is a perspective view according to an alternate embodiment of the present invention.

Referring now to FIGS. 1–8, a water-resistant scope shade attachment apparatus 10 is shown, according to the present invention, comprised of an attachable, portable, water-resistant sun shielding barrel 20 which includes a barrel body 40 having a first end which serves as a barrel grasping collar 30, and a pivotal hood 50 for being removably attached to a sighting end 16 of a telescopic sight 14 of a rifle 12, or the like.

The sun shielding barrel 20, (hereinafter referred to as barrel 20), is of a linearly elongated cylindrical, hollow configuration having an anterior end 21 opposite a posterior end 22.

An elongated flexible, hollow barrel body 40, formed either of rubber or plastic, has a barrel grasping collar 30 which extends a longitudinal length of approximately one inch in a direction from the anterior end 21 to the posterior end 22 of the barrel 20. The barrel body 40 may preferably be made from a Vyram® thermoplastic rubber grade 9101–65 which stretches 10–15% to enable accommodation of more than one optic size. This material has a Shore A hardness of 65.

The barrel grasping collar 30 is designed having an internal diameter slightly larger than the external diameter of the sighting end 16 of a telescopic sight 14, thereby allowing for the barrel grasping collar 30 to mate with the sighting end 16, whereby the barrel grasping collar 30 is securely held thereto through frictional impingement. The barrel grasping collar 30 is inserted on the sighting end 16 a longitudinal distance equal to the longitudinal length of the barrel grasping collar 30.

It is envisioned that the barrel body 40 including the barrel grasping collar 30 may be constructed from rubber or a wide variety of flexible plastics. Being flexible, the barrel grasping collar 30 not only permits use on scopes of various sizes and shapes, but also facilitates quick attachment and removal. However, it is envisioned that specifically molded designs would be made available to adapt integrally with specific types and models of commercially available scopes.

It is envisioned that various sizes of the water-resistant scope shade attachment apparatus 10 would be required so as to accommodate various sight ends 16 for different models of telescopic sights 14.

A pivoting hood 50 is attached to the barrel body 40 by a hinge 44 which is mounted to a top external circumferential surface of the barrel body 40 at the posterior end 22 of the barrel 20, whereby the hood 50 may be pivoted at its hinge point to lay flat against a collar 42 of the barrel body 40. The pivoting hood 50 includes a plurality of projections 52 formed at various points along an inner periphery 54 of the pivoting hood 50 for removably securing a lens 60 (as will be described in greater detail below).

The projections 52 are spaced at an equal distance from one another and are formed of plastic material having resilient properties permitting flexing within reasonable limits for permitting a lens 60 to be inserted at the inner periphery 54 of the pivoting hood 50 and returning to its natural configuration after releasing of tension, thereby removably securing a lens 60 to the inner periphery 54.

The pivoting hood 50 further includes a thin, soft rubber membrane 56 circumferentially joined to a collar 58 thereof so as to form a water-impermeable seal upon a user laying the hood 50 flat against the collar 42 of the barrel body 40. A pair of manipulating impingement tabs 53 extend outward beyond the outer circumferential perimeter of the hood 50 to allow for easy manipulation of the hood 50 into an open or closed condition.

The hood 50 and the barrel body 40 can be locked into their closed position via a hood locking assembly 64. The hood locking assembly 64 is designed so as to cooperate with a hole 46 formed in the collar 42 at a bottom of the barrel body 40.

The hood locking assembly 64 includes a flange 57 formed along a top of the collar 58 of the hood 50 for being removably inserted into the hole 46 of the barrel body 40 so as to be securely locked therein. The flange 57 of the hood 50 is securely held in a locked position via a locking means 59. The locking means 59 is designed to securely hold the flange 57 in position through mechanical interference until such mechanical interference is removed by depression of a hood release button 62. The hood release button 62 is located adjacent to the hole 46 of the barrel body 40 wherein the button 62 extends through an aperture 64 formed therein, and is positioned laterally. The hood release button 62 is designed so as to release the flange 57 from the hole 46 of the barrel body 40 upon being depressed by a user, thereby allowing the pivoting hood 50 to be opened and allowing the user to replace the present lens 60 with an alternate lens 60.

The locking means 59 disclosed wherein mechanical interference is removed via a button 62 is of the type widely known in the art.

It is envisioned that the lens 60 is of a circular configuration being shaped flat or slightly convex, having a diameter so as to be fittingly received on the collar 58 of the pivoting hood 50, and that various degrees of shaded lens having an anti-fog feature are available to the user. Alternatively, a photo-gray lens which automatically adjust to outside light may be utilized.

It is further envisioned that an amber shaded lens 60 be used by the user in low light so as to more readily see game in dark areas. The use of an amber shaded lens 60 effectively removes an animal's natural camouflage with its surroundings and further removes long shadows.

It is still further envisioned that the shaded lens not only provide ultraviolet alpha and ultraviolet beta protection, but also be scratch and shatter proof as well.

At this point, a user can remove the inserted lens 60 and replace it with another desired lens 60. Because the present invention utilized a pivoting hood 50, the lens 60 can be replaced while the present invention remains attached to the telescopic sight 15, thereby allowing the user to quickly change lens 60, which is especially advantageous when game has been spotted by the user.

Once a chosen lens 60 has been securely placed at the inner periphery 54 of the hood 50, the user simply closes the hood 50 so as to actuate the locking means 59 and the hood 50 is securely locked to the barrel body 40, thereby forming a water-impermeable seal which also keeps the sighting end 16 of the telescopic sight 14 dry, clean and protected.

The pivoting hood 50 further allows the user the option of maintaining the hood 50 in an open position while hunting, thereby allowing the user to utilize the telescopic sight 14 in a conventional fashion, and then closing the hood 50 when needed.

The water-resistant scope shade attachment apparatus 10 provides the user with a water-resistant, glare-free rifle telescopic sight 14 attachment which allows the sighting mechanism to perform up to its optimum in all lighting conditions.

A variation of the first embodiment of the present invention is anticipated for removable attachment to a front sight 18 of a telescopic sight 14 for use in conjunction with the water-resistant scope shade attachment apparatus 10 so as to provide a user with greater visibility for spotting game and reducing sun glare. The variation of the first embodiment being designed and configured identical to the preferred embodiment with a single exception: the attachment is inserted on a front sight 18 of a telescopic sight 14 a longitudinal distance such that the front sight 18 rests just short the pivoting hood 50.

A second embodiment of the present invention is shown in FIGS. 9A–C, 10 and 11 in general at 10'. In this embodiment, a set of optic quality lenses 60' has a base curve ranging from plano to an index of 1.55. The lenses 60' will be shatter- and scratch-resistant, being approximately 1–4 mm thick, approximately flat to avoid parallax (as the base curve has been described above), may be polarized and any of a number of color shades including amber, bright yellow, photo-gray, clear, red, vermilion, orange, brown, and various shades of gray. One or both surfaces of lenses 60' may be coated with an anti-reflective coating.

Figure 10:
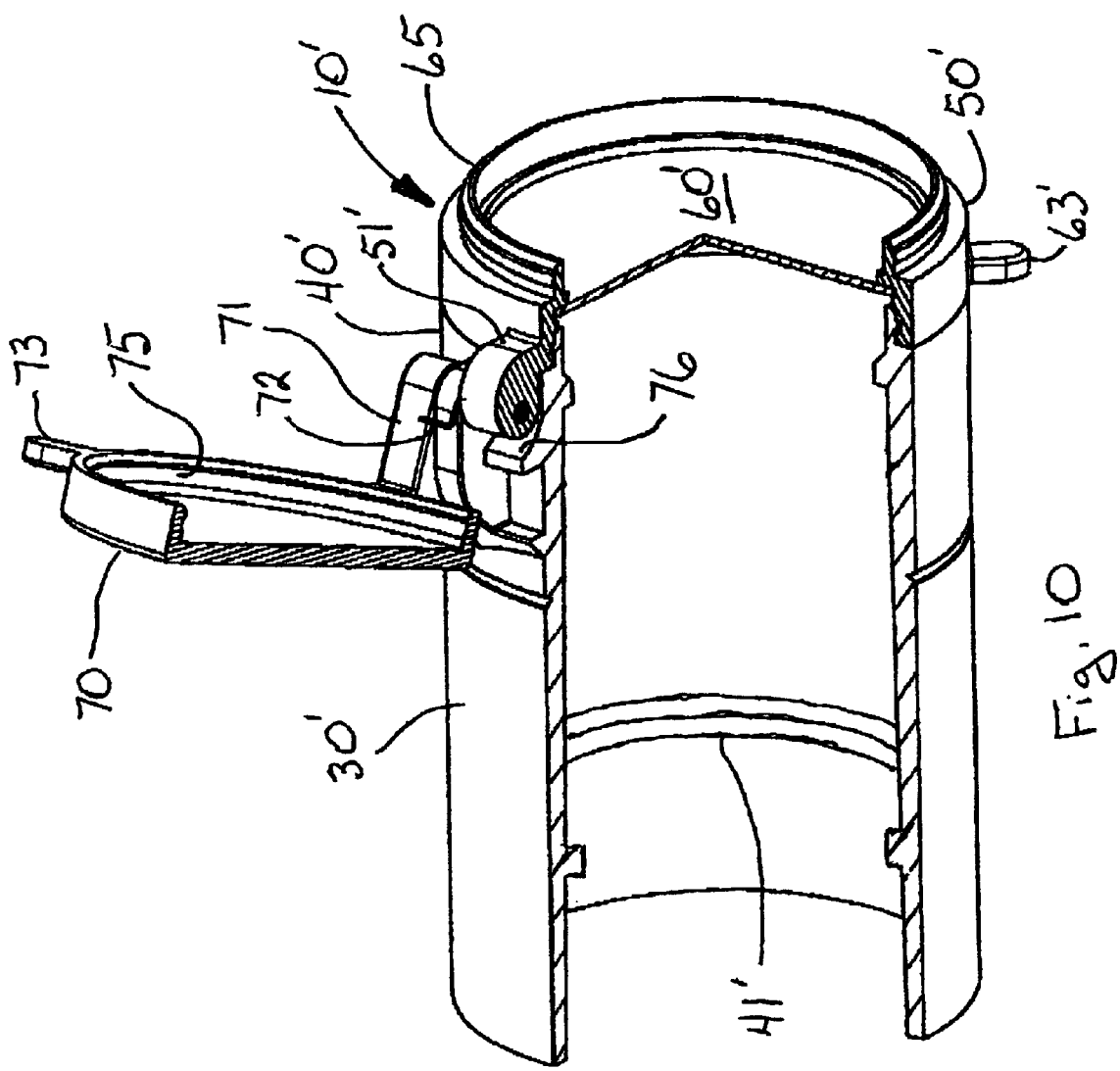
FIG. 10 is a perspective view of a second embodiment in partial section showing the pivoting hood in an open position.
Figure 11:
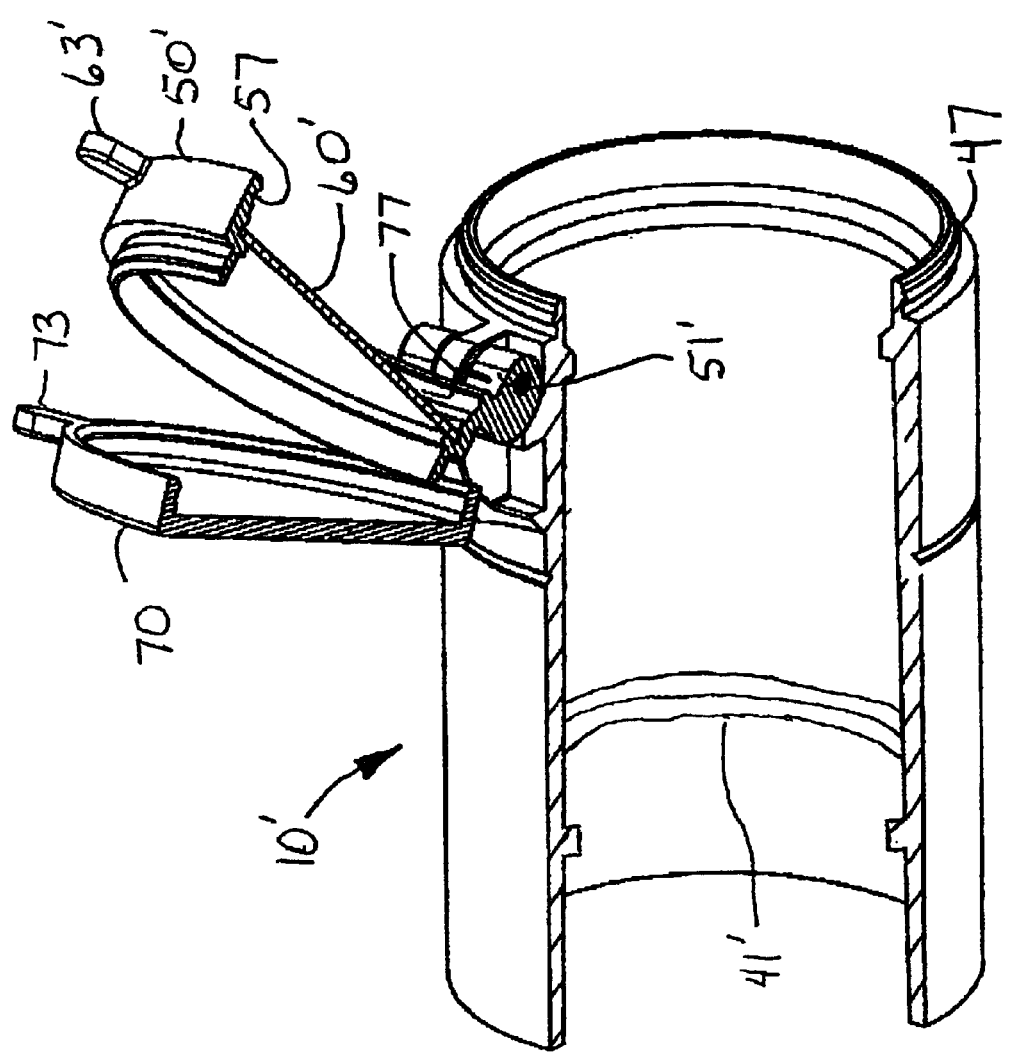
FIG. 11 is a perspective view of the second embodiment in partial section with both the hood and the lens holder in open positions.
Figure 12:
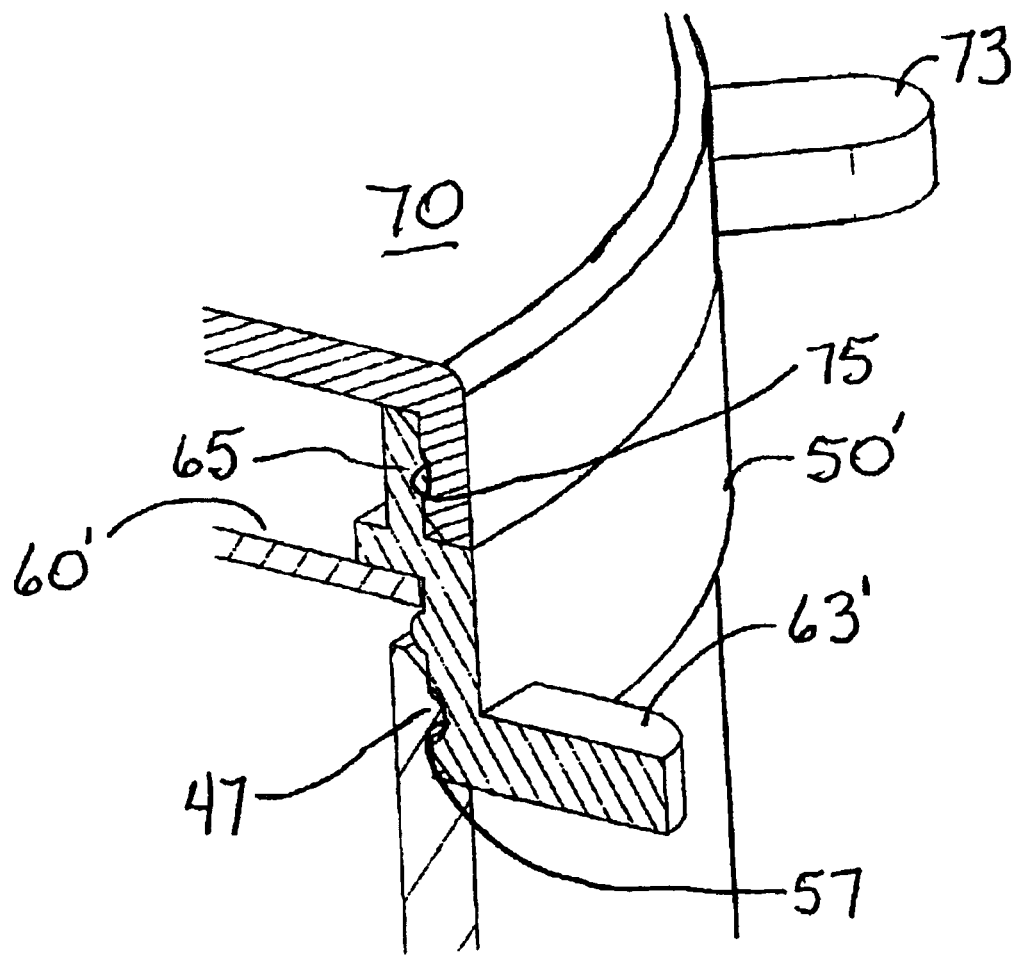
FIG. 12 is an enlarged perspective view with portions cut away showing the frictional engagement between the pivotal elements of the second embodiment.

In order to protect the lens 60' when it is in pivoting hood 50', a lens cap or cover 70 is pivotally mounted atop barrel body 40'. As best seen in FIG. 10, lens cover 70 is pivotable about the same pivot axis as pivoting hood 50'. Shoulder 41' within barrel body 40' will typically be formed 0.75 to 1 inch from the end of barrel grasping collar 30' to afford that length of overlap onto the end of the rifle scope. The overall length of barrel body 40' can be changed to position the lens 60' any distance between 0" and 3" from the sighting end 16 of the optical device. Cover 70 is preferably made of a durable impact-resistant plastic material. For example, HDPE (high-density polyethylene) may be used. Spring arm 72 (FIG. 10) will engage pivot arm 71 of cover 70 to bias it toward an open position. However, the frictional engagement between the recess 75 of lens cap 70 and the protrusion 65 of pivoting hood 50' will be adequate to maintain cap 70 in a closed position until one or impingement tabs 73 on cap 70 is/are engaged to pop the cap 70 open under the influence of spring arm 72 (FIG. 12). It will, of course, be appreciated that the positions of protrusion 65 and recess 75 could be reversed.

Impingement tabs 73 of cap 70 are positioned outboard of tabs 63' on pivoting hood 50' to enable the user to slide his/her hand along the top of barrel body 40' and contact tabs 73 without contacting tabs 63' to open the cover 70 for sighting through the scope. Impingement tabs 63' can be engaged to pivot hood 50' to the position shown in FIG. 11 to permit removal/replacement of lens 60'. Alternative positions for tabs 63' and 73 may enhance their operation. A second spring arm 77 contacts pivot arm 51' of hood 50' to facilitate its popping up to its open position when the frictional resistance between recess 57 of pivotal hood 50' and protrusion 47 of barrel body 40' is overcome. As best seen in FIG. 12, protrusion 47 on barrel body 50' is more pronounced than protrusion 65 on pivoting hood 50' in order to ensure that a greater amount of force is needed to open hood 50' than cover 70. As best seen in FIG. 10, pivot-limiting shoulder 76 on barrel body 40' contacts the rear portion of pivot arm 51 and limits the pivoting of pivot hood 50' so that it does not come into contact with cover 70 facilitating manipulation of lens 60'.

It is envisioned that the present invention may be utilized with other optical equipment including, but not limited to, cameras, telescopes, and binoculars, each of which has an optical device which has a cylindrical body to which the shade apparatus of the present invention may be attached. Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

Various changes, alternatives and modifications will become apparent to one of ordinary skill in the art following a reading of the foregoing specification. For example, the lenses have been described as removable. However, it will be apparent that a fixed lens can be incorporated into the scope hood of the present invention without departing from the spirit thereof. It is intended that any such changes, alternatives and modifications as fall within the scope of the appended claims be considered part of the present invention.

I claim:

1. A water-resistant shade apparatus for attachment to a sighting end of an optical device, said shade apparatus comprising:

a) a sun shielding barrel which includes a cylindrical barrel body;

b) a pivoting hood affixed to said barrel by a hinge enabling said pivoting hood to be pivoted toward and away from the sighting end about a first pivot axis, said pivoting hood housing a lens and being spring biased to an open position;

c) a pivoted cover overlying said pivoting hood pivotable about said first pivot axis between a first open position in which the optical device is used and a second closed position in which said lens in said pivoting hood is protected, said cover also being spring-biased to an open position.

2. The water-resistant shade apparatus of claim 1, further comprising a shoulder formed internal to said barrel body and designed to impinge against the sighting end of the optical device positioning said lens in said pivoting hood in a range between 0" and 3" from the end of the optical device.

3. The water-resistant shade apparatus of claim 1, further comprising a set of lenses which may selectively be inserted into said pivoting hood, said lenses having at least one of the features of a) optic quality;

b) polarization;

c) shatter and scratch resistance;

d) tinting with a color;

e) a base curve from piano up to index 1.55; and f) an anti-reflective coating.

4. The water-resistant shade apparatus of claim 3, tinting for said lenses is selected from a group of colors consisting of amber, bright yellow, photo-gray, clear, red, vermilion, orange, brown, and various shades of gray.

5. The water-resistant shade apparatus of claim 3 wherein each of said lenses of said set has at least five of the six features enumerated in a)–f).

6. The water-resistant shade apparatus of claim 1, wherein said cover is spring-biased to an open position, but, when closed, frictional resistance between a first annular recess on one of said cover and said pivoting hood and a first annular protrusion on the other of said pivotal hood and said cover is sufficient to maintain said cover closed.

7. The water-resistant shade apparatus of claim 6 wherein said pivoting hood is also spring-biased to an open position, but, when closed, frictional resistance between a second annular recess on one end of said pivotal hood and said barrel body and a second annular protrusion on the other of said barrel body and said pivotal hood is sufficient to maintain said pivotal hood closed.

8. The water-resistant shade apparatus of claim 7, wherein said second annular protrusion requires greater force to disengage from said second annular recess than said first annular protrusion from said first annular recess.

9. The water-resistant shade apparatus of claim 8, further comprising at least one first impingement tab attached to said cover facilitating overcoming said frictional resistance between said first annular protrusion and said first annular recess.

10. The water-resistant shade apparatus of claim 9, further comprising at least one second impingement tab attached to said pivoting hood facilitating overcoming said frictional resistance between said second annular protrusion and said second annular recess.

11. The water-resistant shade apparatus of claim 1 further comprising a pivot-limiting shoulder formed on said barrel body which engages a portion of said pivotal hood to keep it spaced from said cover when both said pivotal hood and said cover are in their open positions to facilitate manipulation of said lens housed in said pivotal hood.

12. The water-resistant shade apparatus of claim 1 wherein said pivoting hood has a plurality of resilient projections for engaging and retaining said lens, said resilient projections facilitating changing of said lens in the field without removing said sun shielding barrel from said optical device.

* * * * *